United States Patent [19]

De La Chevrotiere

[11] Patent Number: 5,402,751
[45] Date of Patent: Apr. 4, 1995

[54] PET LITTER BOX

[76] Inventor: Jean-Francois De La Chevrotiere, 1979 Emile-Nelligan, Varennes, Quebec, Canada

[21] Appl. No.: 215,589

[22] Filed: Mar. 22, 1994

Related U.S. Application Data

[63] Continuation-in-part of Ser. No. 79,404, Jun. 21, 1993, abandoned.

[51] Int. Cl.$^6$ .............................................. A01K 1/035
[52] U.S. Cl. ..................................... 119/166; 209/373
[58] Field of Search ....................... 119/166, 167, 165; 209/251, 373, 374

[56] References Cited

U.S. PATENT DOCUMENTS

| | | | |
|---|---|---|---|
| 3,233,588 | 2/1966 | Thomas | 119/166 |
| 4,096,827 | 6/1978 | Cotter | 119/166 |
| 4,522,150 | 6/1985 | Gershman | 119/165 |
| 4,846,104 | 7/1989 | Pierson, Jr. | 119/166 |
| 5,168,834 | 12/1992 | Buschur | 119/166 |

Primary Examiner—Robert P. Swiatek
Attorney, Agent, or Firm—Eric Fincham

[57] ABSTRACT

A pet litter box having a built in filter comprising a base portion which has a litter receiving area and a cover portion which has a screen member attached thereto, the screen member extending below the underside of the cover and being spaced therefrom to define a waste receiving pocket between the underside of the cover and the screening member. When it is desired to clean the litter box, the cover is placed on the base and the full assembly is rotated such that the used litter will enter the waste receiving pocket with the screen member filtering any clumping and/or solid material therefrom while permitting passage of the non used litter material back to the litter receiving area of the base portion; the cover may then be removed and the used litter discarded.

4 Claims, 2 Drawing Sheets

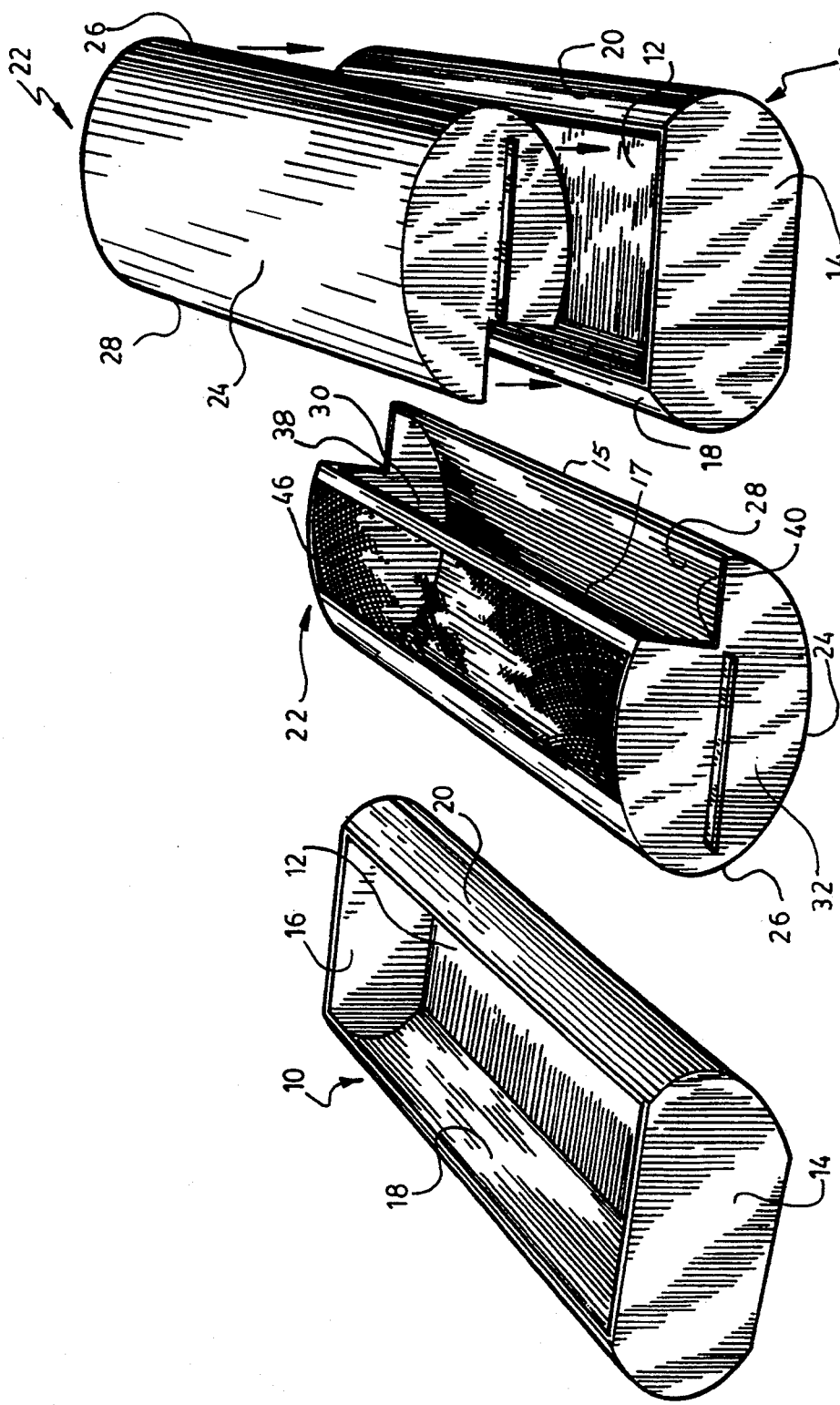

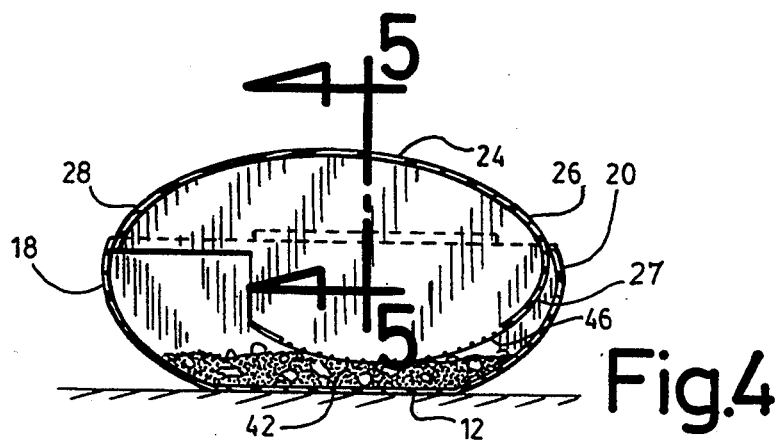
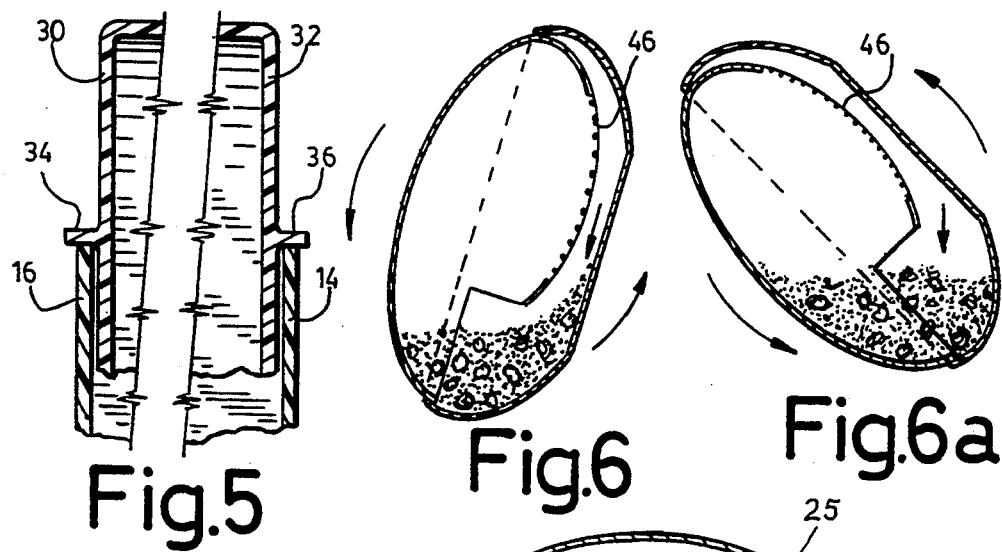
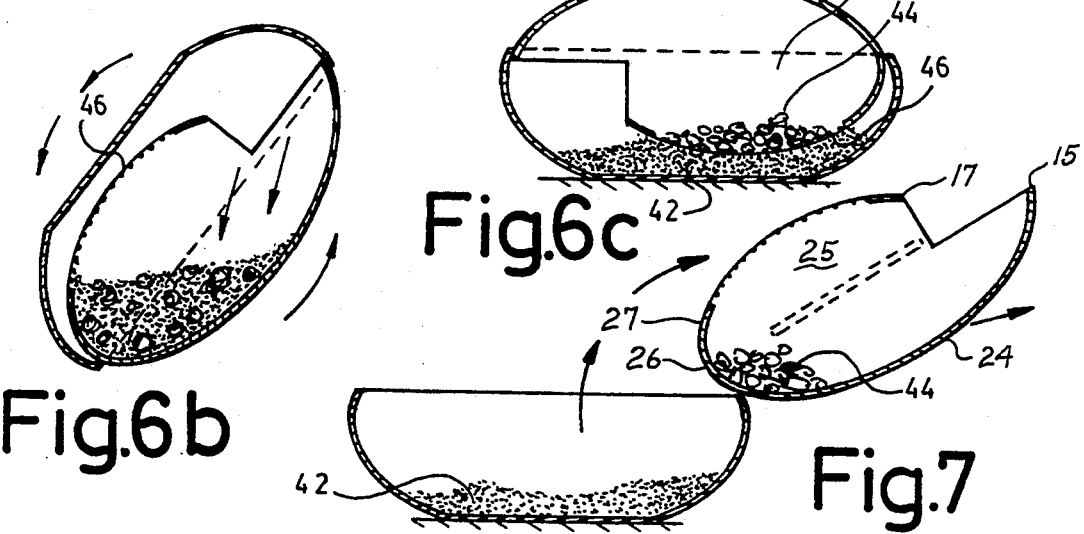

PET LITTER BOX

The present application is a continuation-in-part of application Ser. No. 08/079,404, filed Jun. 21, 1993, now abandoned.

BACKGROUND OF THE INVENTION

The present invention relates to a pet litter box and more particularly, relates to a pet litter system which includes a filtering and disposing device.

Pets kept indoors in dwellings are conventionally provided with a litter box in which the animal may relieve itself. Traditionally, these litter boxes have been some form of a container having a quantity of "litter" material which may comprise anything from sand or absorbent granular particles or indeed, even shredded paper. On a commercial basis, a number of commercial products are available and these include absorbent products which are designed to "clump" when they absorb urine. Thus, when it is desired to clean the litter box, normally there still remains a substantial quantity of useful litter. Therefore, it is desirable to separate the still useful litter remaining in the litter box the solid feces and the clumping granular material which has absorbed the urine.

There are a number of known systems for removal of the solid and clumped material from the litter. These devices include various filter screens which may be lifted from the litter box and through which the still useful litter will pass while the solid material is retained on the screen. However, once this has been done, there does remain the problem of replacing the filter in the litter.

It is also known in the art to have a filter or screening system in a housing which can accommodate a cat or the like as disclosed in U.S. Pat. No. 4,522,150 to Gershman. In this patent, there is provided a top or cover having a removable drawer-like container mounted in the upper portion of the housing. The arrangement is somewhat cumbersome and expensive to manufacture.

SUMMARY OF THE INVENTION

It is an object of the present invention to provide a litter box construction which includes a built in filter.

It is a further object of the present invention to provide a litter box .construction wherein a built in filter may be used to filter solid and clumped material from the filter whereafter the still useable litter material returns to a useful position and the filtered material may be discarded.

According to one aspect of the present invention, there is provided a pet litter box which has a base portion and a cover portion, the base portion having a litter receiving area formed therein. The cover portion has a pair of spaced apart solid end walls, first and second solid side walls, and a solid top wall which extends between the first and second side walls. The second side wall extends downwardly from the top wall in an arcuate manner and also extends somewhat inwardly. There is a screen member which is spaced from the top wall and which is secured to the second side wall to thereby define a waste receiving pocket which is bounded by the top wall, the screen member and the second side wall. An opening to the waste receiving pocket is defined between free marginal edges of the first side wall and the screen member. The free marginal edge of the first side wall is in a horizontal plane which is above the horizontal plane of the free marginal edge of the screen member when the cover portion is in a position to be placed on the base portion. The arrangement is such that the assembled base and cover can be turned on its side such that litter material in the base portion will enter the waste receiving pocket through the opening and upon continued rotation of the box to an upright position, the screening member will filter used litter and solid material therefrom while permitting passage of non-used litter material back to the litter receiving area of the base portion. When the cover portion is lifted, the used litter and solid material remain on an interior surface of the second side wall to permit it to be disposed of.

In greater detail, the litter box of the present invention is suitable for any animal which normally use such litter boxes. The most common use of these boxes is with respect to cats and the invention, although not so limited, will be described with respect thereto.

The base portion of the litter box will be substantially conventional in that it will comprise a base with an upwardly extending wall thereabout to provide a litter receiving area into which the litter may be placed for use by the animal. The overall configuration of the box may be varied; the invention will be described with respect to a substantially rectangular configuration although it will be understood that this configuration may be modified and the essence of the invention does not include any particular configuration save and except for that sufficient to meet the purposes of the invention.

There is provided a cover portion which is adapted to fit on top of the base portion to thereby define a covered litter box. Preferably, there are provided means for locking or connecting the base portion and the cover portion together and again, such interlocking means are well known in the art and any conventional ones may be employed.

The cover portion includes a screen member which functions to filter the solid and clumped material from the still useful litter as will be explained hereinbelow.

To this end,, the screen member is formed so as to be spaced from the underside of the cover and thereby to define between the underside of the cover and the screen member a waste receiving area. This waste receiving area or pocket formed between the two extends for only a portion of the total area of the underside of the cover. This is to permit entry of the material into the waste receiving pocket and to this end, the screen may extend anywhere from 30% to 90% of the total area of the cover member although preferably, it will extend more than 50% and less than 80% of the distance to thereby permit easy access to the area by the used litter.

Although the material utilized in the construction of the litter box is a matter of choice, preferably, it will be formed of a plastic material for purposes of ease of manufacture and performance. Thus, suitable plastic materials will minimize any absorption of odors and may easily be cleaned.

In operation, the clumping litter is placed in the litter receiving area in the bottom of the base portion. When it is desired to clean the litter box (normally after two-- four days) the cover member will then be secured thereto and the box will turned on its side such that the litter will enter the waste receiving pocket formed between the screen and the underside of the cover member. Once the container is completely upside down, the litter will rest on the underside of the cover portion. A continued rotation of the litter box will cause the litter to then rest on the screen member whereby the litter which has not absorbed any waste material will be permitted to pass through the screen back to the litter receiving area of the base portion. The cover member may then be detached and the material contained in the waste receiving pocket may then be disposed of. The cover member is then put away till the next cleaning operation.

In this connection, it will be understood that although the litter box has been described with using the cover member only during the cleaning operation, one may utilize a separate cover during normal use of the litter box by the animal.

Having thus generally described the invention, reference will be made to the accompanying drawings illustrating an embodiment thereof, in which:

BRIEF DESCRIPTION OF THE DRAWINGS

FIG. 1 is a perspective view of a base portion of the litter box;

FIG. 2 is a perspective view of the top member of the litter box;

FIG. 3 is a perspective illustrating assembly of the litter box;

FIG. 4 is an end view of the assembled litter box;

FIG. 5 is a sectional view taken along the lines 5—5 of FIG. 4;

FIGS. 6, 6a, 6b and 6c illustrate operation of the litter box to filter out useable litter from solid material; and FIG. 7 illustrates operation of the litter box for disposal of the solid material.

DETAILED DESCRIPTION OF THE INVENTION

Referring to the drawings in greater detail, and by reference characters thereto, the litter box has a base member 10 illustrated in FIG. 1. Base member 10 has a bottom 12, a pair of end walls 14 and 16 and a pair of side walls 18 and 20 to thereby form a litter receiving area. It will be noted that side walls 18 and 20 extend upwardly in an arcuate fashion for reasons which will be apparent hereinafter.

Cover member 22 is illustrated in FIG. 2 and is formed of a top 24 with solid side walls 26 and 28 extending therefrom. In this respect, it will be noted that top 24 has, when seen from a side view, an arcuate configuration and thus merges with side walls 26 and 28 to have an overall concave configuration. Cover member 22 also includes a pair of opposed solid end walls 30 and 32.

Referring to FIGS. 2 to 4, side wall 26 not only merges arcuately with top 24, but also, as indicated by reference numeral 27, has a portion which extends inwardly. A screen member 46 extends between end walls 30 and 32 and merges arcuately with portion 27 of side wall 26. There is thus defined a waste receiving pocket 25 bounded by top wall 24, side walls 28 and 26 (including portion 27) and screen member 46.

End walls 30 and 32 have cutout portions 38 and 40 as may be seen from FIG. 2. A free marginal edge 15 of side wall 28 lies in a horizontal plane which is above the horizontal plane of the free marginal edge 17 of screen 46. In this respect, it will be understood, as seen in FIG. 2, that there is a reinforcing member also extending along the free marginal edge of screen 46.

In the normal course of events, base member 10 is filled with a litter material 42 to be used by the animal. When it is necessary to clean the litter, cover member 22 is placed in position as indicated in FIG. 3. Thus, end wall 30 and 32 of cower member 21 fit within end walls 14 and 16 of base member 10. Flanges 34 and 36 act as a stop.

Subsequently, as indicated in FIGS. 6, 6a, 6b and 6c, the entire litter box is rotated so as to permit the used litter material to enter the waste receiving pocket defined by screen 46 and top 24. Upon further rotation of the device, the solid material 44 will be retained by screen 46 while the balance of the litter 42 will pass through a screen 46. Subsequently, the cover member 22 may be removed as indicated in FIG. 7 to remove the litter to be disposed of. It will be noted that the cover may easily be gripped by grasping the free marginal edge 15 of the cover portion whereby the solid material 44 will rest on side wall 26 to eliminate any spillage. In other words, portion 27 of side wall 26 and the arcuate portion of cover 24 permit the used litter to be transported without danger of any droppings passing through the screen.

It will be understood that the above described embodiment is for purposes of illustration only and that changes and modifications may be made thereto without departing from the spirit and scope of the invention.

What is claimed is:

1. A pet litter box comprising a base portion having a litter receiving area and a cover portion, said cover portion having a pair of spaced apart solid end walls, first and second solid side walls, a solid top wall extending between said first and second side walls, said second side wall extending from said top wall in an arcuate manner downwardly and inwardly, a screen member spaced from said top wall and being secured to said second side wall to thereby define a waste receiving pocket, said pocket being bounded by said top wall, said screen member and said second side wall, an opening to said waste receiving pocket being defined between free marginal edges of said first side wall and said screen member, the free marginal edge of said first side wall being in a horizontal plane which is above the horizontal plane of the free marginal edge of said screen member when said cover portion is in a position to be placed on said base portion, the arrangement being such that when the assembled base portion and cover portion are turned on their sides, litter material in said base portion will enter said waste receiving pocket through said opening and upon continued rotation of the box to an upright position, said screen member will filter used litter and solid material therefrom while permitting passage of non-used litter material back to said litter receiving area of said base portion, and when said cover portion is lifted, said used litter and said solid material will remain on an interior surface of said second side wall to thereby be transported for disposal.

2. The pet litter box of claim 1 wherein said top and said screen member of said cover portion have a generally convex configuration to define therebetween said waste receiving pocket.

3. The litter box of claim 1 wherein said cover portion and said base portion are formed of a plastic material.

4. The litter box of claim 1 wherein said cover portion has a flange on each end wall thereof to define a stop member.

* * * * *